US008411432B1

(12) United States Patent
Zimlin et al.

(10) Patent No.: US 8,411,432 B1
(45) Date of Patent: Apr. 2, 2013

(54) SYSTEM, APPARATUS AND METHOD FOR TIERED SHOCK SOLUTION

(75) Inventors: Steve Zimlin, Austin, TX (US); Jonathan Bowen, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 136 days.

(21) Appl. No.: 12/629,231

(22) Filed: Dec. 2, 2009

(51) Int. Cl.
*G06F 1/16* (2006.01)
*H05K 5/00* (2006.01)
*H05K 7/00* (2006.01)

(52) U.S. Cl. .............................. 361/679.55; 361/679.34

(58) Field of Classification Search ............. 361/679.01, 361/679.02, 679.33–679.45, 679.55
See application file for complete search history.

(56) References Cited

U.S. PATENT DOCUMENTS

| | | | | |
|---|---|---|---|---|
| 5,583,742 A * | 12/1996 | Noda et al. | ............... | 361/679.21 |
| 5,706,168 A * | 1/1998 | Erler et al. | ............... | 361/679.34 |
| 6,179,122 B1 * | 1/2001 | Moncrief et al. | ............. | 206/320 |
| 6,496,362 B2 * | 12/2002 | Osterhout et al. | ....... | 361/679.34 |
| 6,498,719 B1 * | 12/2002 | Bridges | ..................... | 361/679.34 |
| 6,522,763 B2 * | 2/2003 | Burleson et al. | ............. | 381/189 |
| 6,661,604 B2 * | 12/2003 | Hashizume et al. | ........ | 360/97.19 |
| 6,882,528 B2 * | 4/2005 | Chuang | .................... | 361/679.35 |
| 7,106,580 B2 * | 9/2006 | Kugimiya et al. | ........ | 361/679.22 |
| 7,106,583 B2 * | 9/2006 | Koh et al. | ................ | 361/679.36 |
| 7,167,360 B2 * | 1/2007 | Inoue et al. | .............. | 361/679.34 |
| 7,224,580 B2 * | 5/2007 | Shimada et al. | ......... | 361/679.27 |
| 7,232,960 B2 * | 6/2007 | Matsumoto et al. | .......... | 174/544 |
| 7,242,552 B2 * | 7/2007 | Kudo et al. | ................ | 360/97.12 |
| 7,375,959 B2 * | 5/2008 | Chang | ..................... | 361/679.33 |
| 7,382,607 B2 * | 6/2008 | Skillman | .................. | 361/679.55 |
| 7,471,509 B1 * | 12/2008 | Oliver | ...................... | 361/679.33 |
| 7,502,224 B2 * | 3/2009 | Motoe | ...................... | 361/679.33 |
| 7,535,698 B2 * | 5/2009 | Iwamoto et al. | ......... | 361/679.55 |
| D598,919 S * | 8/2009 | Takemasa et al. | .......... | D14/432 |
| 7,586,739 B2 * | 9/2009 | Weksler et al. | .......... | 361/679.26 |
| 2002/0043608 A1 * | 4/2002 | Nakata et al. | ................. | 248/560 |
| 2002/0044416 A1 * | 4/2002 | Harmon et al. | ............... | 361/685 |
| 2002/0057813 A1 * | 5/2002 | Burleson et al. | .............. | 381/189 |
| 2002/0085342 A1 * | 7/2002 | Chen et al. | ..................... | 361/683 |
| 2002/0085346 A1 * | 7/2002 | Choi | ............................. | 361/685 |
| 2002/0093792 A1 * | 7/2002 | Cheng | ........................... | 361/704 |
| 2003/0174464 A1 * | 9/2003 | Funawatari et al. | .......... | 361/685 |
| 2003/0179543 A1 * | 9/2003 | Sri-Jayantha et al. | ........ | 361/683 |
| 2004/0025993 A1 * | 2/2004 | Russell | ......................... | 150/154 |
| 2004/0032711 A1 * | 2/2004 | Kaczeus et al. | .............. | 361/685 |
| 2004/0130866 A1 * | 7/2004 | Itakura et al. | ................ | 361/685 |
| 2005/0063152 A1 * | 3/2005 | Chen et al. | .................... | 361/685 |
| 2005/0168935 A1 * | 8/2005 | Inoue et al. | ................... | 361/685 |
| 2005/0174730 A1 * | 8/2005 | Chen et al. | .................... | 361/685 |
| 2005/0257949 A1 * | 11/2005 | Lalouette | ........................ | 174/50 |
| 2006/0023416 A1 * | 2/2006 | Chen | ................................ | 361/685 |
| 2006/0042996 A1 * | 3/2006 | Picot et al. | .................... | 206/586 |
| 2006/0061954 A1 * | 3/2006 | Lam | ............................. | 361/685 |

(Continued)

*Primary Examiner* — Adrian S Wilson
(74) *Attorney, Agent, or Firm* — Larson Newman, LLP

(57) ABSTRACT

Embodiments of a tiered damping solution to protect a computer system from shock are disclosed. More specifically, in one embodiment at an external level the computer system may be protected from a shock and vibration by the use of dampeners which may be located on the chassis of the computer system to cover possible contact points. The devices are isolated from remaining shock or vibration by utilizing isolating materials at points where the device mounts to, or otherwise contacts, the chassis. Within the device itself another tier of protection may serve to protect components within a device by isolating the components from the points at which the component mounts to, or otherwise contacts, the device.

16 Claims, 13 Drawing Sheets

U.S. PATENT DOCUMENTS

| | | | |
|---|---|---|---|
| 2006/0066769 A1* | 3/2006 | Minaguchi et al. | 349/58 |
| 2007/0041149 A1* | 2/2007 | Homer et al. | 361/681 |
| 2007/0133121 A1* | 6/2007 | Xu et al. | 360/97.01 |
| 2007/0253101 A1* | 11/2007 | Miyairi | 360/97.01 |
| 2007/0257410 A1* | 11/2007 | Toh et al. | 267/153 |
| 2008/0024963 A1* | 1/2008 | Weksler et al. | 361/681 |
| 2008/0074831 A1* | 3/2008 | Lee et al. | 361/683 |
| 2008/0083640 A1* | 4/2008 | Liu | 206/522 |
| 2008/0098489 A1* | 4/2008 | McEwan et al. | 726/34 |
| 2008/0128318 A1* | 6/2008 | Kokinda | 206/701 |
| 2008/0164790 A1* | 7/2008 | Tsang et al. | 312/223.2 |
| 2009/0009955 A1* | 1/2009 | Motoe | 361/685 |
| 2009/0154087 A1* | 6/2009 | Goto | 361/679.27 |
| 2010/0091444 A1* | 4/2010 | Reid et al. | 361/679.37 |

* cited by examiner

SYSTEM, APPARATUS AND METHOD FOR TIERED SHOCK SOLUTION

TECHNICAL FIELD

Embodiments of the invention relate generally to electronic devices such as mobile computers. More particularly, embodiments of the invention relate to mobile computers and other portable or handheld devices and in particular to the damping or absorption of shocks and vibration to mobile computers and other portable or handheld devices.

BACKGROUND

With the advent of the computer age, electronic systems have become a staple of modern life, and some may even deem them a necessity. Part and parcel with this spread of technology comes an ever greater drive for more functionality from these electronic systems. A microcosm of this quest for increased functionality is the size and capacity of various semiconductor devices. From the 8 bit microprocessor of the original Apple I, through the 16 bit processors of the original IBM PC AT, to the current day, the processing power of semiconductors has grown while the size of these semiconductors has consistently been reduce. In fact, Moore's law recites that the number of transistors on a given size piece of silicon will double every 18 months.

As these complex systems have involved, their use in the mobile environment has increased. As the mobility of such devices has increased, they are, in turn subject to increasing amounts of shocks and vibrations which results from their transport and use. Consequently, the protection of the components in these mobile devices has presented a problem. This problem has been exacerbated in the mobile environment, where packaging limitation and the resulting space and weight constraints may raise further impediments to adequate protection of components utilized in such mobile devices.

These problems may manifest themselves even more dramatically in the context of implementing mission critical mobile computing platforms, such as mobile computers designed to be utilized by members of the armed services in combat situations or other arenas or situations where the proper operation of these electronic components is of the utmost importance. As these mission critical mobile devices may have a number of operational constrains imposed on them, including constraints related to shock resistance (such as MIL-810-F, MIL-810-G), imperviousness to liquids, operating temperature, radiation emissions, etc. of such mission critical mobile devices may be even more difficult, as necessities imposed by other constraints (for example, sealed portions of chassis, chassis material, etc.) may further limit the protection solutions which may be utilized.

Previous attempts at addressing shock and vibration have dramatically increased system height, weight, width and depth as a result of bulky isolation enclosures, while other solutions do not address the source of the shock or vibrations which may be present at the system or component level.

As it is still desired to protect such mobile devices and components in these mobile devices, (especially in the context of mission critical devices where protection may be especially desired), what is required are sophisticated and effective solutions for optimizing protection while simultaneously accounting for desired system dimensions, manufacturability and weight.

SUMMARY

Embodiments of a tiered damping solution to protect a computer system and its components from shock and vibration are disclosed. More specifically, in one embodiment such a tiered damping solution comprises multiple tiers of protection designed to substantially optimize protection of the computer system and its associated devices while accounting for the desire to minimize system dimensions, including, system weight, height, depth, etc. At an external level the computer system may be protected from a shock and vibration by the use of dampeners or bumpers which may be located on the chassis of the computer system to cover possible contact points. The devices are isolated from remaining shock or vibration by utilizing isolating materials (such as at one or more mounting points of a device) at points where the device mounts to, or otherwise contacts, the chassis. Within the device itself another tier of protection may serve to protect components within a device by isolating the components from the points at which the component mounts to, or otherwise contacts, the device.

Some embodiments may include determining the dampening requirements for the computer, identifying the maximum shock or vibration that a critical component may withstand before failure or identifying areas of the computer system with which dampening material may be utilized such that the size, location, shape, material, etc. of the materials utilized at any one tier may be better determined. The strategic application of a multi-tiered shock solution may afford better, smaller, more easily manufactured and lighter protection in conjunction with computer systems, which may be particularly useful in a mobile computing environment.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, cooling of electronic components has become increasingly difficult in a number of environments. This problem becomes especially apparent in the context of mobile electronic devices where packaging limitation and commensurate space constraints may present certain impediments, such as mobile computers. These problems may manifest themselves even more dramatically when it is desired to utilize such mobile electronic devices in a mission critical setting, where a number of requirements and demands may be placed on such mobile electronic devices. Implementing mobile electronic devices for mission critical settings may therefore entail engineering and manufacturing these mobile computing devices to tolerate a variety of conditions or events and to comply with a variety of other requirements, which may include, for example, drop or impact standards, tolerance or resistance to water ingress, temperature or other operating ranges, etc. Meeting these various standards may, however, require implementing designs or solutions which place further limitations on the types of cooling solutions which may be utilized with the mobile electronic device.

Figure 1B:
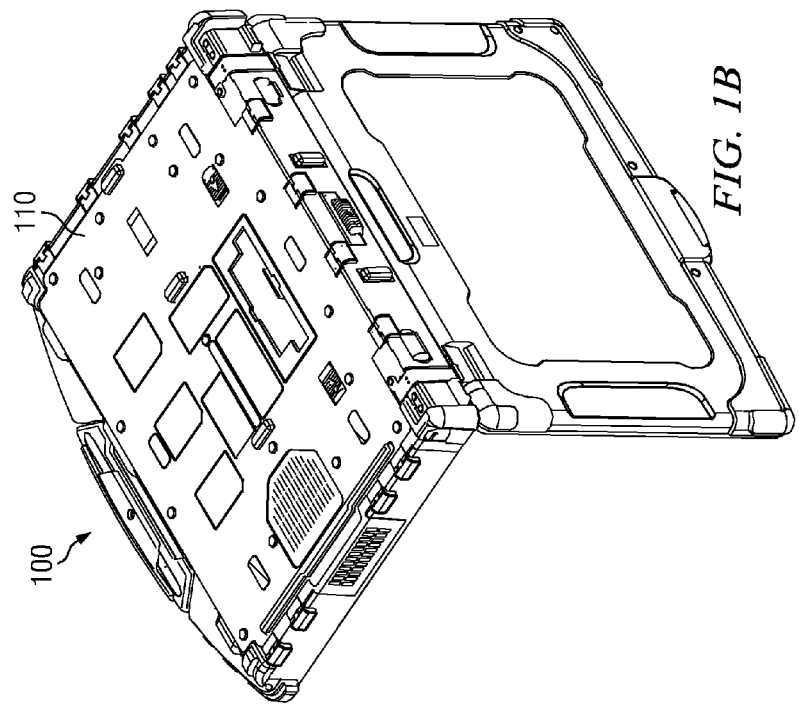
FIGS. 1A and 1B are depictions of one embodiment of a mobile computing device.
Figure 1A:
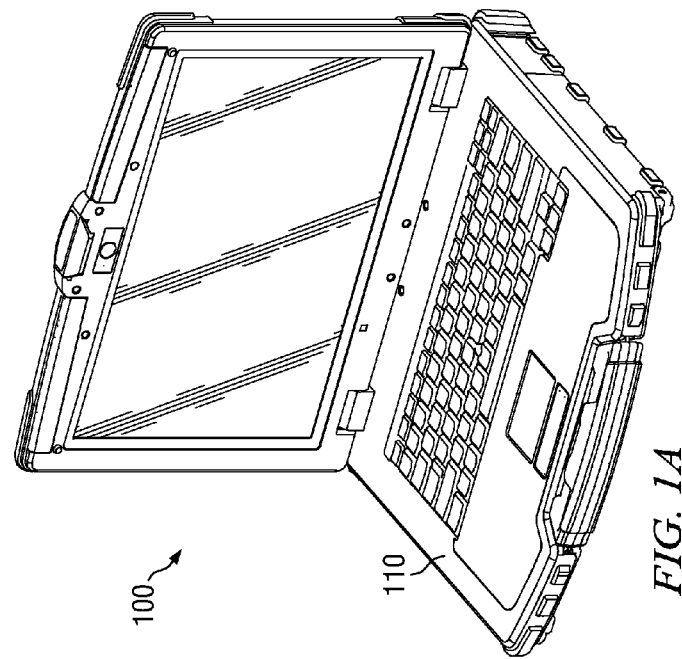

The constraints imposed, and the need for balancing between these constraints, with respect to various types of mobile electronic devices may be better understood with reference to FIGS. 1A and 1B which depict one embodiment of a mobile computing device constructed for use in a mission critical setting. Mobile computer 100 may be constructed to conform to one or more standards promulgated by a standards body or a potential user of the mobile computer 100. These standards may pertain to environmental tests designed to prove that mobile computer 100 can remain operation in a variety of conditions. These environmental tests may cover areas such as drop, vibration, impact shock, water resistance, altitude, high temperature, low temperature, temperature shock, humidity, etc. Examples of such standards include those issued by the U.S. Army's Developmental Test Command, including MIL-STD-810F, MIL-STD-810G, MIL-STD-461E, IEC 60529 etc.

To comply with certain of these standards then, mobile computer 100 may comprise chassis 110 constructed to isolate or protect electronic components of mobile computer 100 from shock, vibration, water, etc. Consequently chassis 110 may be sealed, of a certain thickness, constructed of a certain type of material, etc. The design of such a chassis 110 may, however, place restraints on the types of shock absorption which may be used in conjunction with mobile computer 100.

The design of devices or components of mobile computer 100 may, either because of being designed to meet certain standards or for other reasons altogether, also place constraints on the types of shock absorption solution which may be utilized with mobile computer 100. These types of constraints are problematic, as certain of the standards pertaining to mobile computer such as MIL-STD-810F and MIL-STD-810G may pertain to the ability of mobile computer 100 to withstand shock (for example, from drops from 4 feet onto a concrete substrate or other impacts).

To meet these standards, in conjunction with the limitations or constraints placed on the cooling solutions used by the design of components of mobile computers in an extremely rugged case or one made out of thick or exotic material may be utilized. These solutions may, however, be expensive, heavy or relatively ineffective.

What is desired, then, are effective shock dampening (where the term "dampening" will be used herein to refer to any type of reduction of energy transfer) solutions which may be utilized with computing devices (i.e. any type of device comprising electronic components) and, in particular, embodiments of which may be effectively utilized with mission critical mobile computing devices, given the commensurate constraints imposed by the desire to comply with promulgated standards or other requirements or desired characteristics of these mission critical mobile computing devices, including those having to do with weight and price.

To that end, attention is now directed to a tiered shock dampening solution to protect a computer system and its components from shock (which will be used herein to collectively refer to shock, vibration, impact, drop, other types of transferred energy, etc.). More specifically, in one embodiment such a tiered shock dampening solution comprises multiple tiers of protection designed to protect the computer system and its associated devices while accounting for the desire to minimize system dimensions, including, system weight, height, depth, etc. More particularly, a first tier of shock protection may comprise external shock protection, the second tier of shock protection may comprise system (also referred to as device or zone) level shock protection and a third tier of shock protection may comprise component level shock protection.

In one embodiment, the external shock protection of the first tier may comprise the use of dampeners (any material affixed to the chassis for purpose of dampening shock) which may be located on the chassis of the computer system to cover possible contact points. These dampeners may be positioned relative to corners, edges or surfaces of a laptop to dampen shock before it reaches the chassis, such that the devices within the chassis are at least partially isolated from shock. More specifically, the dampeners may be constructed and affixed to chassis such that the contact with one or more of the plurality of dampeners is dampened (absorbed in, distributed through, transferred, etc., as discussed) via the material to inhibit propagation of shock resulting from the contact to the chassis or components within the chassis.

The second tier of protection may protect devices within the chassis from shock, which, for example may be transmitted through the chassis despite the use of the first tier of protection, by isolating, dampening or restraining one or more devices within the chassis based at least in part on the mounting scheme utilized to mount the device within the chassis of the computer system. Components within these devices may be further protected from remaining energy transmitted to the component despite the use of a second tier of protection. This third tier of protection may comprise the isolation, dampening or restraint of one or more components within a device based at least in part on the mounting scheme utilized to connect the component to the device.

Figure 2:
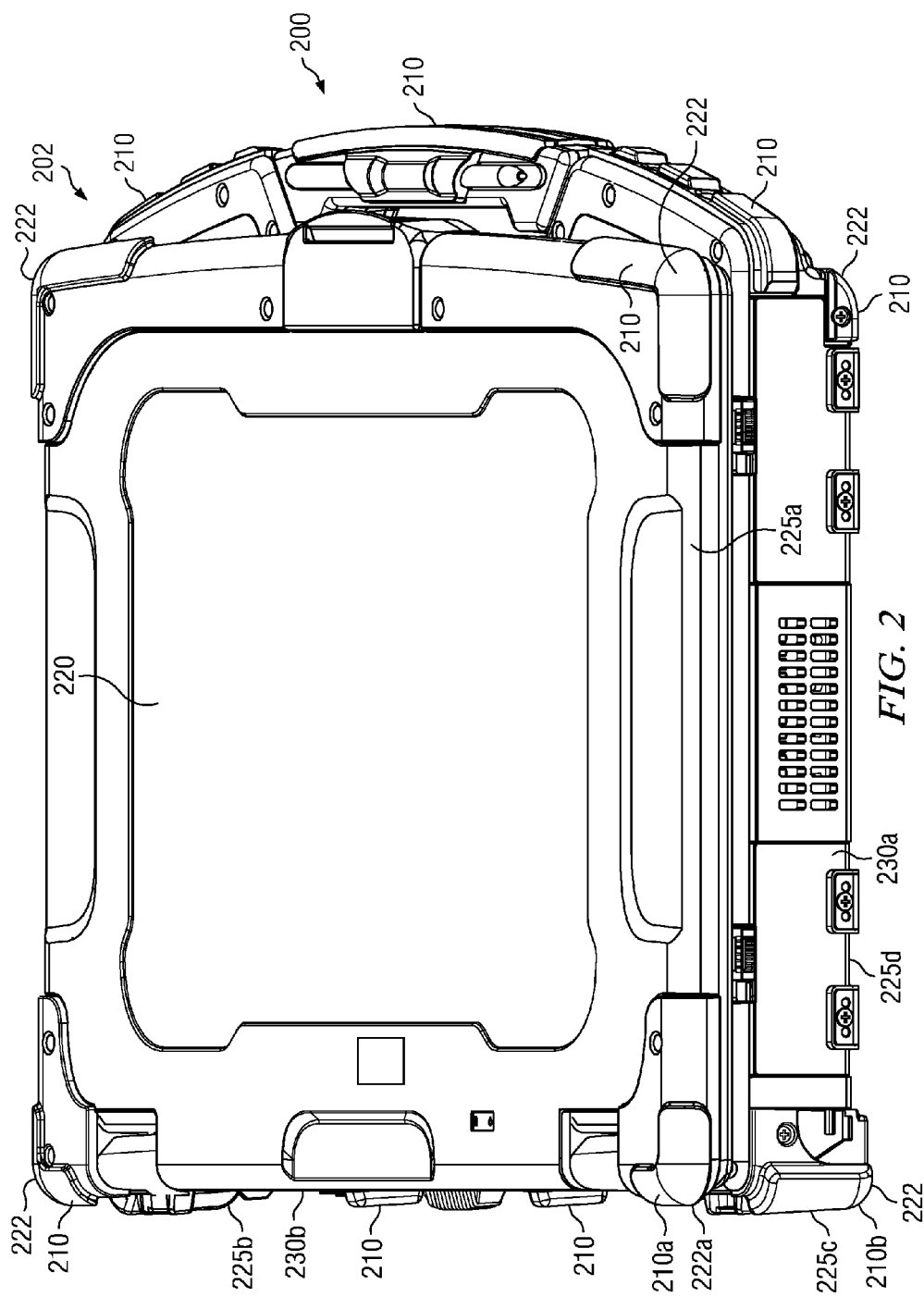
FIG. 2 is a view of one embodiment of a chassis of a mobile computer having dampeners.

Moving now to FIG. 2, a mobile computing device employing one embodiment of a first tier of shock protection is depicted. Mobile computer 200 may comprise a chassis 202 with a first tier of shock protection comprising a number of dampeners 210 affixed to the chassis 202. These dampeners 210 may be positioned relative to corners, edges or surfaces of a laptop to substantially dampen shock before it reaches the chassis 202, such that the electronic devices and component of mobile computer 200 are, at least partially, protected from shock.

To determine size, shape, location, material, etc. of such dampeners 210 the dampening requirements for the mobile computer 200 may be determined. This determination may include identifying the value of a shock that, when applied to the chassis, causes failure of the component. For example, the dampening requirement for a mobile laptop computer may correspond to the maximum force that can be applied to chassis 202 before a device or component fails (for example, the motherboard cracks, the hard drive fails, the display fails etc.). Identifying the value of a shock may include reviewing data provided by a manufacturer, computer-simulated analyses, or empirically testing the device (for example, performing a drop test). MIL-STD-810F describes performance standards for one type of drop test, and there may be other standards as well.

After identifying a shock that could damage the computer or otherwise render it unavailable for use, areas on the chassis may be identified for positioning of a system to dampen the shock. Identifying the areas may include identifying access doors, vents, ports, or other openings over which a dampener should not be positioned. U.S. patent application Ser. No. 12/204,586 entitled "System, Method and Apparatus for Battery Cooling and Protection," which is hereby incorporated by reference, describes one example of a door over which positioning a dampener may not be desirable. U.S. patent application Ser. No. 12/204,160 entitled "System, Method and Apparatus for Dual Heatsink Cooling Solution for Computers" which is hereby incorporated by reference, describes one example of a vent over which positioning a dampener may not be desirable.

Additionally, in some situations, overall weight of the mobile computer 220 may be an issue. In these situations, identifying areas for which it is desirable to position the system may include ensuring the total weight of the computer and the affixed system for dampening shock and vibration does not exceed a desired amount. Thus, although it may be desirable to affix dampeners to the entire chassis, the weight of the computer and dampeners may be such that affixing dampeners to the computer chassis may require affixing dampeners to only certain areas of the chassis. Another factor which may be considered in the location or shape of such dampeners is the manufacturability of the dampeners, chassis, etc.

Identifying areas may also include identifying corners, edges and surfaces for which it is desirable to dampen a shock. In one embodiment, it is desired to prevent contact from occurring first on any one of a number of possible contact points. These contact points may comprise places on the chassis 202 where the chassis 202 may possibly impact a flat surface when the mobile computer 200 is dropped onto such a flat surface. For example, chassis 202 may comprise 26 possible contact points. These contact points may comprise the six plane surfaces which comprise the top 220 and bottom (not shown) of the chassis 202 and the four sides 230 (two of which are shown), the eight corners 222 of the chassis 202 (six of which are shown) where the six plane surfaces of the chassis 202 intersect and the 12 edges 225 between any two of each of the six planes of the chassis 202, for example edge 225a is between the top 220 and side 230a. Thus, the number and location of dampeners 210 may be determined based upon the identified contact points such that when mobile computer 200 is dropped onto a flat surface the first contact between the flat surface and the mobile computer will occur on one of dampeners 210.

The number, size and shape of the dampeners 210 to be affixed to the chassis at each of the identified areas can likewise be determined. This determination may be made based upon a wide variety of criteria such as the desired amount of energy which it is desired to dampen (for example, a calculated force of impact), possible dimension(s) of impact, the dimensions of the chassis 202, the weight and material of mobile computer 200 or chassis 202, the shape of the chassis 202, the material to be utilized to form dampeners 210, etc. In some embodiments, the material used to form dampeners 210 may be a thermoplastic elastomer such as the Isodamp C-8000 series or C-1000 series of materials by E-A-R Specialty Composites or the LC 346-178 Shore 55A Vibration Damping Thermoplastic elastomer by GLS Corporation. The size and shape of each dampener may be determined based on the desire as mentioned above, to have first contact occur on a dampener, and additionally may be determined based on the selected material such that given the other criteria (weight of the mobile computer 200, force of impact, etc.) the dampener will protrude sufficiently from chassis 202 and dampen enough transferred energy that when contact is made with a flat surface the dampener 210 will not compress or deflect to allow the external surface to contact the chassis 202.

Once the number of dampeners 210, the size and shape for each of the dampeners 210 and the area of the chassis where these dampeners 210 should be positioned are determined, the dampeners are manufactured and affixed to the chassis 202. These dampeners may be manufactured using, for example, overmolding. In one embodiment, affixing a dampener to the chassis 202 may involve overmolding a material to the areas of the chassis 202 identified for positioning. Here, overmolding may be an injection molding process wherein the chassis 202 is positioned in an injection molding machine and a material is injected into the machine to form a dampener onto the chassis 202. If properly selected, the overmolded material will form a strong bond with the chassis 202 that is maintained in the end-use environment. The use of primers or adhesives may thus not be required to achieve an optimum bond between the overmolded material and the chassis. The use of overmolding also eliminates the need for screws or other fasteners to hold dampeners to chassis 202.

However, the use of overmolding the dampeners directly onto a chassis may create manufacturability issues, including excess scrap issues, as if a dampener is malformed, an entire chassis may need to be scrapped. Thus, in some embodiments, plastic frame injection molding may be used to form a dampener 210, by overmolding the material of which the dampener 210 is to be composed (for example, an elastomer as discussed above) onto an injection molded plastic frame. The plastic frame comprising the formed dampener 210 may then be chemically, mechanically or thermally affixed to the area(s) of the chassis 202 identified for positioning of that dampener utilizing, for example, an adhesive, a heat stake (for example, one or more heat stakes formed on the injection molded plastic frame) a fastening screw, etc. The particular method used to affix a particular dampener may be determined based upon one or more functional criteria (force, shear, etc.) or one or more aesthetic criteria.

It may be useful here to illustrate the positioning and use of embodiments of such dampeners 210. For example, dampener 210a may be positioned at corner of chassis 202 such that it may serve to at least partially dampen shock resulting from an impact on the chassis on the top 220, side 230a, side 230b, corner 222, edge 225a between top 220 and side 230a and edge 225b between top 220 and side 230b. Similarly, dampener 210b may be positioned such that it may serve to at least partially absorb shock resulting from an impact on the chassis on the bottom (not shown), side 230a, side 230b, edge 225c between side 230a and side 230b, edge 225d between side 230a and the bottom and the edge (not shown) between side 230b and the bottom of the chassis 202. Other dampeners 210 (some not shown), protect other planes, corners, or edges of chassis 202 such that all possible 26 contact points of chassis 202 are protected against shock through the use of a dampener 210 configured to dampen shock received from an impact on that contact point.

Figure 3:
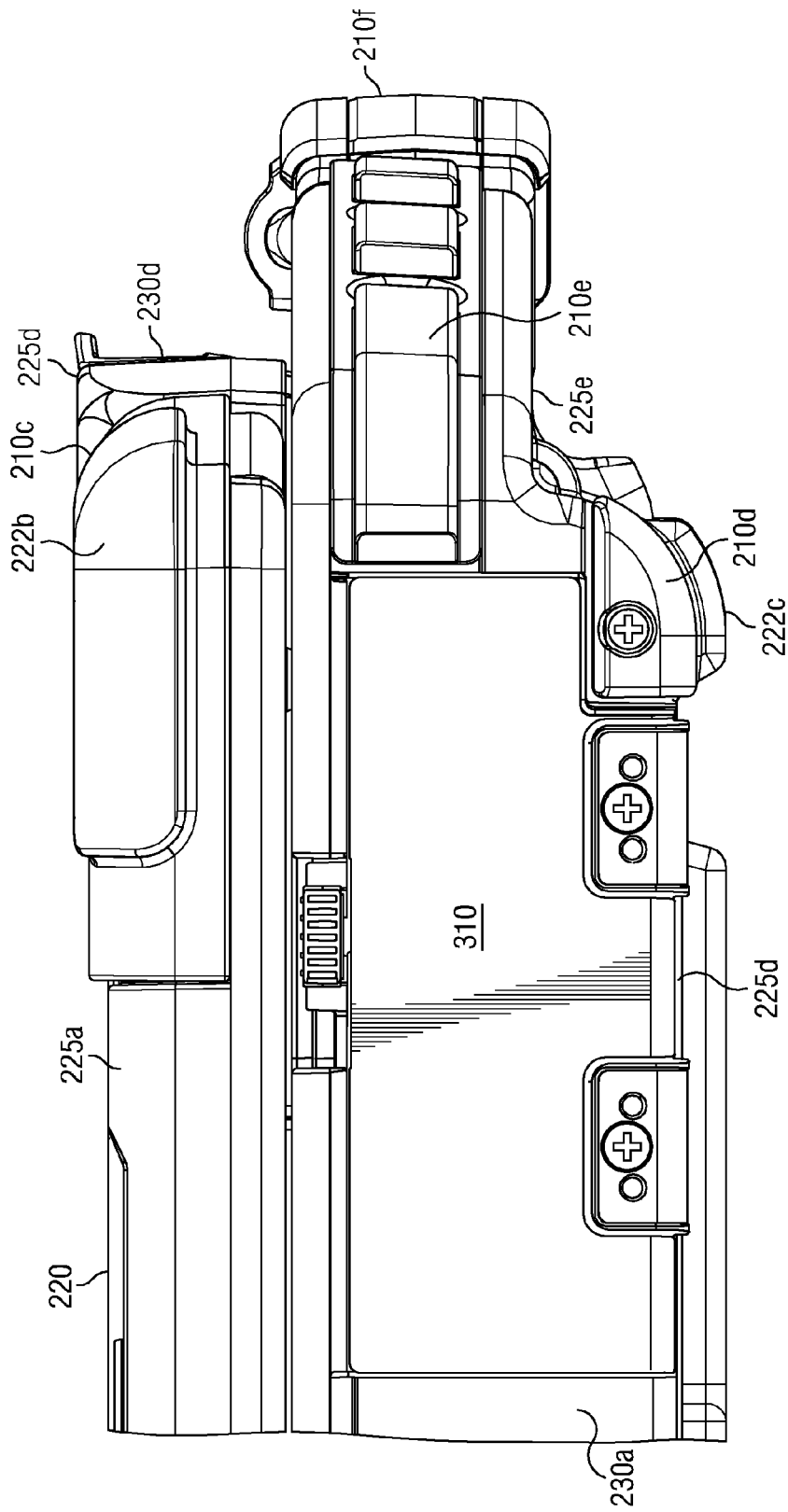
FIG. 3 is a view of one embodiment of a chassis of mobile computer having dampeners.

As discussed above, the positioning, size, shape, etc. of one or more dampeners may be determined based on the identification of access doors, vents, ports, or other openings over which a dampener should not be positioned. It may still be desired, however, despite the presence of such openings to locate dampeners in the vicinity of such openings in order to more effectively protect one or more of the 26 contact points described above. FIG. 3 depicts a close up of side 230a of chassis 202 including a hard disk drive door 310 which is an opening to a hard disk compartment within chassis 202 and configured to receive a hard disk drive device. Thus, when identifying a position for the placement of dampeners 210 it is desired that dampeners should not be positioned over hard disk drive door 310.

Notice here then that dampener 210c may be formed such that it does not cover hard disk drive door 310 and protects the top 220, side 230a, side 230d, corner 222b, edge 225a between top 220 and side 230a and edge 225d between top 220 and side 230d. Dampener 210d may be formed such that they do not cover hard disk drive door 310 and at least partially protect the bottom (not shown), side 230a, side 230d, corner 222c, edge 225d between bottom and side 230a. Dampener 210e may be formed such that it does not cover hard disk drive door 310 and at least partially protects the side 230d, side 230a, edge 225e between side 230a and side 230d. Dampener 210f may be formed such that it does not cover hard disk drive door 310 and at least partially protects side 230d.

As will be noted after a review of the above, the size, location, shape, material, etc. of the dampeners to utilize in conjunction with a particular mobile computer may be determined based on a dampening requirement based on a number of criteria, including the weight of mobile computer, and dimension(s) of impact, dimensions and materials of chassis, desired impact resistance, properties of materials to be used for dampeners, etc. In one embodiment, this determination may involve determining the total energy involved with a drop of the mobile computer from a particular height, the amount of energy that a material to be used to compose the dampeners can dissipate, the strength of the chassis 202, the energy that can go into chassis before any components of the mobile computer 100 fail, etc. Additionally, it will be noted that the efficacy of the dampeners used in any particular embodiment may be verified through simulation or through empirical testing.

Despite the use of these dampeners, however, in some cases energy may be transferred through the chassis to the internal components of a mobile computer. Alternatively, in some embodiments, the dampeners may be designed to allow a certain amount of energy to be transferred to the chassis. In any event, within a mobile computer, some devices with certain types of components may be highly sensitive to shock (relative to other devices in the mobile computer) including devices which have hard disks, optical drives, mother boards, etc. Thus, it may be desired to protect these sensitive devices within the chassis from shock, which, for example, may be transmitted through the chassis despite the use of the first tier of protection. This second tier of protection (referred to as zone level protection) may be achieved, in one embodiment, by isolating or dampening one or more devices within the chassis based at least in part on the mounting scheme utilized to fix the device within the chassis of the computer system.

In one embodiment, to implement zone level protection for one or more devices, first the devices which it is desired to protect may be identified. For each of these devices factors such as a mounting scheme for the device, the device's mechanical interaction with the system (including the type of connection(s) the device has with other devices or components of the mobile computer) and the directionality of possible energy transfer may be identified. Then, taking into account these factors and the amount of energy which will make the device fail, a shock protection solution for the device may be determined. This shock protection solution may serve to dampen or isolate a device by, in general, dampening or isolating the device by restraining the movement of the device in whichever directions in which it is possible, given the type of connection which allows the device to interface with other devices or components. If such a connection is a rigid connection the movement of the device may be dampened along the plane comprising the connection (in addition to any dampening or isolation used in conjunction with the other planes). If the connection is a floating connection (for example, a cable connector), however, the shock solution may encompass providing some degree of freedom in one or planes to allow for such a connection. The particular dampening solution to be utilized in conjunction with any one device may therefore be device specific and be determined based on a number of criteria associated with the device and the mobile computer in which the device is being utilized.

While a person of ordinary skill in the art, after reviewing the present disclosure, will be able to determine a particular zone level protection for a particular device in a particular chassis it may be helpful here to illustrate one particular embodiment of zone level protection which may be utilized for a hard disk drive in a mobile computer housed in a chassis such as that described above with respect to FIGS. 1-3.

Figure 4:
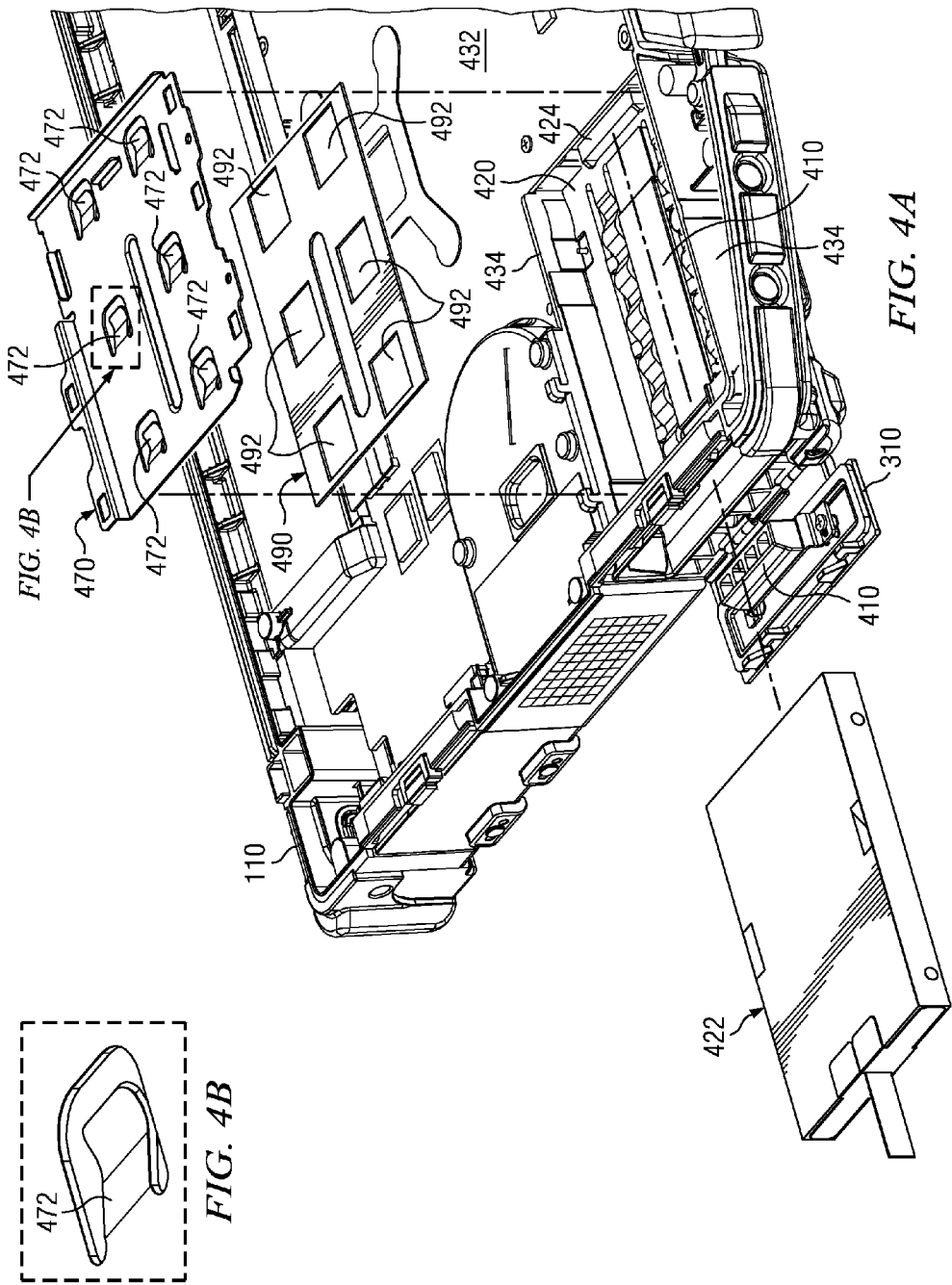
FIGS. 4A and 4B are a view of one embodiment of a chassis of a mobile computer having a hard disk compartment.

FIG. 4 depicts a diagram of one embodiment of just such an embodiment of zone level protection. More specifically, particular devices, such as hard drives, may have standard form factors or other requirements for use in certain settings. For example, in a mobile computer environment a standard form factor for a hard disk drive device may be 2.5 inches and it may be desired that such a hard disk drive device be removable from a chassis of a mobile computer in under five seconds. To meet these requirements, chassis 110 of mobile computer 100 may comprise a hard disk drive compartment 420 in chassis 110 where the hard disk drive compartment 420 is configured to accept a hard disk device in a hard disk drive case 422 of the desired form factor (in this example, 2.5 inches), where the hard disk drive case 422 comprises a hard disk drive (where the case and the drive are collectively referred to as a hard disk drive device) such that the hard disk drive may be coupled to other components of the mobile computer 100 through connector 424 of hard disk drive compartment 420. The hard disk drive door 310 may be closed to form the enclosed hard disk compartment 420. Thus, when enclosed, hard disk compartment 420 may comprise six walls (one of which is hard disk drive door 310 and another of which is the wall comprising connector 424), a bottom, top, right side and left side. To implement zone level protection with respect to the hard disk drive device of hard drive case 422 then, it may be desired to provide some form of damping or isolation with respect to the hard disk drive case 422 and one or more of the walls, bottom or top of hard disk compartment 420.

Figure 5:
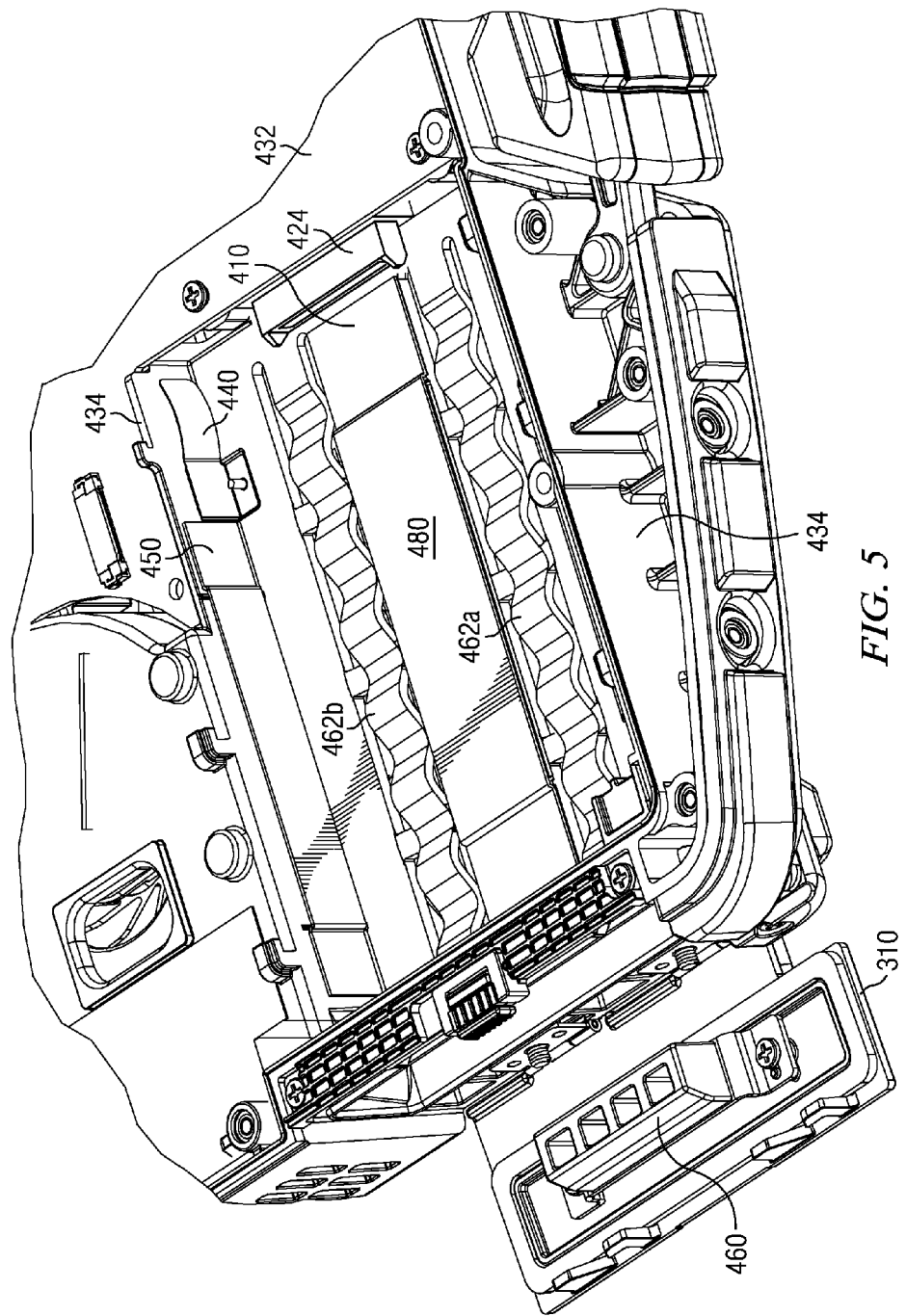
FIG. 5 is a view of one embodiment of a hard disk compartment.

One embodiment of such zone level protection may be explained in more detail with respect to FIG. 5 which shows hard disk compartment 420 in more detail. In the embodiment depicted the hard disk compartment 420 comprises the hard disk drive door 310, a first wall 432 comprising the connector 424 opposite the hard disk door 310 and two side walls 434. A leaf spring 440 may be configured along each side wall to at least partially isolate or dampen the hard disk drive device comprising hard disk drive case 422 in a plane of travel substantially perpendicular to side wall 434 when hard disk device case 422 is inserted into hard disk drive compartment. Additionally, dampening material 450 such as a thermoplastic elastomer (as discussed above) may cover portion of sidewall 434 not covered by leaf spring 440 to provide additional dampening or isolation to a hard disk drive case 422 when inserted. Dampening material 460 may furthermore be affixed to hard disk drive door 430 where there is a sufficient amount of dampening material 460 such that when a hard disk drive case 422 is inserted into hard disk drive compartment 420 and the hard disk drive door 310 is closed, hard disk drive case 422 will be substantially restricted from travel in a plane of travel substantially perpendicular to hard disk drive door 310 and additional isolation and dampening will be provided to hard disk drive case 422 when inserted into the compartment 420.

Moreover, in one embodiment, in addition to the dampening and isolation provided by leaf springs 440, isolation material 450 along each side wall 434 and on hard disk drive door 310 it may be desired to provide isolation or dampening with respect to the bottom of the hard disk compartment 420. This dampening or isolation may comprise one or more leaf springs 462 on the bottom of the hard disk compartment 420, where the leaf springs 462 may be substantially integrated with the chassis 110 of the mobile computer 100, and dampening material 480 affixed to the bottom of the compartment 420. These leaf springs 462 and dampening material 480 may serve to isolate or dampen the hard disk drive case 422 in a plane of travel substantially perpendicular to the bottom of the hard disk compartment 420 when hard disk device case 422 is inserted into hard disk drive compartment 420.

Similarly, referring briefly back to FIG. 4, it may be desired to provide isolation or dampening with respect to the top of the hard disk compartment 420. Accordingly, the top to the hard disk compartment 424 may comprise bracket 470 having a number of leaf springs 472 formed therein. Bracket 470 may be made of a metal such as copper or the like and form the top to hard disk compartment 420 by, for example, being configured to be screwed or otherwise affixed, to the side walls 434 of the hard disk compartment 420 (or another location of chassis 110) such that the leaf springs 472 formed in the bracket 470 may provide dampening or isolation to the hard disk drive case 422 in a plane of travel substantially perpendicular to bracket 470 when hard disk drive case 422 is inserted into hard disk drive compartment 424. To provide additional dampening or isolation to hard disk device case 422, a sheet 490 comprised of dampening material may be placed between the bracket 470 and the hard disk drive case 422. This sheet 490 may be formed to include one or more holes 492 such that each of the leaf springs 472 of the bracket 470 may be aligned with the holes 492 when the bracket 470 is affixed to the chassis to form hard disk compartment 420 and thus each leaf spring 472 may directly contact hard disk drive case 422 when it is inserted into hard disk compartment 420.

Figure 6:
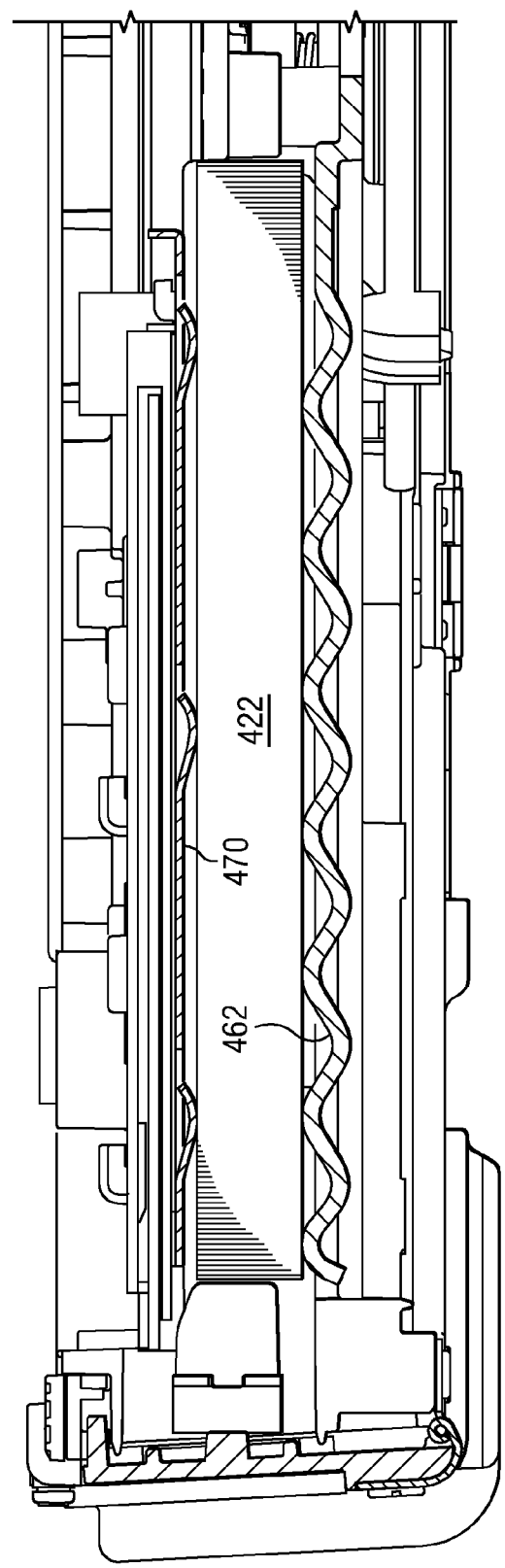
FIG. 6 is a view of one embodiment of a hard disk compartment.

To aid in an understanding of the zone level protection scheme for a hard disk drive device described above, FIG. 6 depicts a cross sectional view of such an embodiment. Here, notice that bracket 470 with leaf spring 472 forms the top of hard disk compartment 424 and leaf springs 472 contact hard disk drive case 422 through sheet 490 of dampening material between bracket 470 and hard disk drive case 422. Notice as well that leaf springs 462 at the bottom of the hard disk drive compartment 420 additionally contact hard disk drive case 422.

While embodiments of a zone level protection scheme have been described and explained specifically with respect to one embodiment of a hard disk device a person of ordinary skill in the art, after a thorough review of this disclosure will be able to devise suitable zone level protection including the size, location, shape, material, etc. to utilize in conjunction with other devices in other settings based on a number of factors, including a mounting scheme for the device, the devices mechanical interaction with the system, including the type of connection(s) the device has with other devices or components of the mobile computer and the directionality of possible energy transfer may be identified and the amount of energy which will make the device fail. Additionally, it will be noted that the efficacy of the zone level protection used in any particular embodiment may be verified through simulation or through empirical testing.

Despite the use of zone level protection schemes, however, in some cases energy may be transferred through the cases of such devices to the actual components of such devices. Alternatively, in some embodiment zone level protection may be designed to allow a certain amount of energy be transferred to the component of a device. In any event, certain components may be sensitive to shock including hard disks, optical drives, etc. Thus, it may be desired to protect these sensitive components within certain devices from shock, which, for example may be transmitted through a case of the device despite the use of zone level protection. This third tier of protection (referred to as component level protection) may be achieved, in one embodiment, by isolating or dampening a component of a device within the case of that device.

In one embodiment, to protect components within a device, factors pertaining to that particular component such as the components mechanical interaction with the device, including the type of connection(s) the component has with other devices or components of the mobile computer or an internal connection within the case and the directionality of possible energy transfer may be identified. Then, taking into account these factors and the amount of energy which will make the component fail, a shock protection solution for the component may be determined. This shock protection solution may serve to dampen or isolate a component within a device by, in general, dampening or isolating the component by restraining the movement of the device in whichever directions in which it is possible, given the type of connection which is to be utilized with the component. The particular protection solution to be utilized in conjunction with any one component may therefore be specific to the particular component and the device with which the component is to be utilized, where the component level protection solution may be determined based on a number of criteria associated with the component, the device comprising the component and the mobile computer in which the device is being utilized.

While a person of ordinary skill in the art, after reviewing the present disclosure, will be able to determine a component level scheme for a particular component in a particular device in a particular chassis it may be helpful here to illustrate one particular embodiment of a component level protection scheme for a hard disk drive in a mobile computer housed in a chassis having a hard disk compartment such as that described above with respect to FIGS. 1-6.

Figure 7:
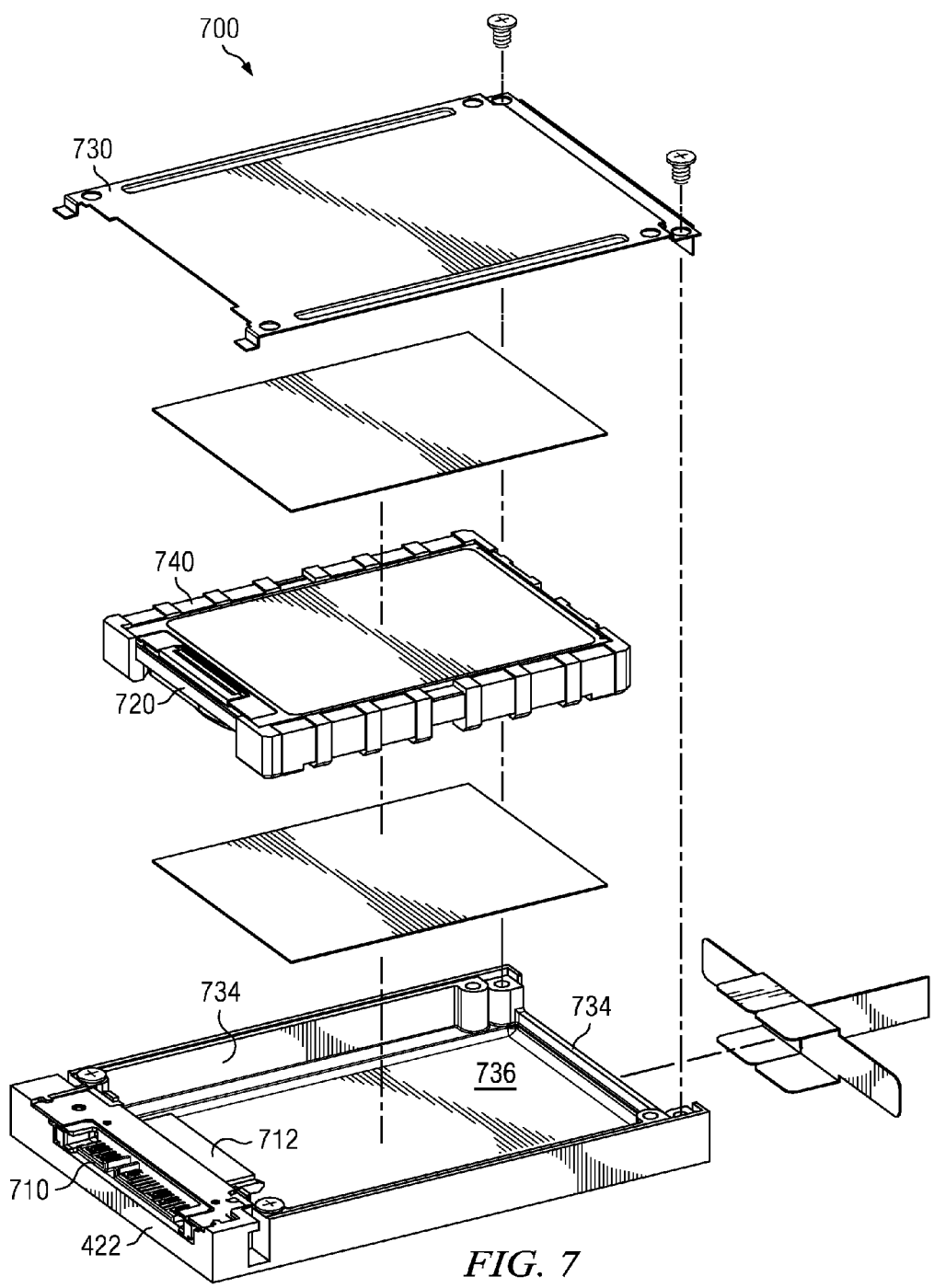
FIG. 7 is a view of one embodiment of a hard disk device.

FIG. 7 depicts a diagram of one embodiment of just such an embodiment of a component level protection scheme. More specifically, particular devices, such as hard drives, may have standard form factors or other requirements for use in certain settings. For example, in a mobile computer environment a standard form factor for a hard disk drive may be 2.5 inches. Thus the cases for these devices may conform to a standard form factor. The actual components utilized within these devices, however, may be smaller than the form factor of the cases. For example, certain hard drives may be 1.8 inches. Accordingly, it is possible to implement a component level protection scheme to protect a particular component within the case of a particular device.

In the embodiment illustrated, hard disk device 700 comprises hard disk drive case 422 of a 2.5 inch form factor which contains an external connector 710 to interface with connector 424 in a hard disk drive compartment 420 of mobile computer 100 and an internal connector 712 to interface with a hard drive component 720. Hard drive component 720 may be smaller than hard disk drive case 422, and may for example, be a 1.8 inch hard disk drive. Thus, when enclosed by hard disk drive case cover 730, hard disk case 700 may comprise six internal walls 734 (one of which is a wall comprising internal connector 424), a bottom 736, top 730 and sides 734.

To implement a component level protection scheme with respect to the hard disk drive component 720 then, it may be desired to provide some form of dampening or isolation with respect to the hard disk drive component 720 and one or more of the walls 734, bottom 736 or top 730 of hard disk case 720. In the embodiment depicted, this dampening or isolation may be achieved through the use of dampening material disposed between the hard disk component and the hard disk case. Specifically, in one embodiment, hard disk drive component 720 may be surrounded at least partially by one or more hard drive dampener support frames 740 molded of a dampening material, as described above. These hard drive support frames 740 may be dimensioned based on dimensions of hard disk drive component 720 and hard drive case 420 and configured such that when they surround hard disk drive component 720 they extend beyond hard disk drive component 720 in every dimension and the combination of the hard drive dampener support frames 740 and the hard disk drive component 720 is substantially the dimensions defined by the interior walls of the hard disk drive case 420. Thus, as hard disk drive component support frames 740 are larger in every dimension than hard disk component 720 and the combination of the hard disk drive component support frames 740 and the hard disk drive component 720 is substantially the dimensions of the interior walls of hard disk drive case 420, the hard disk drive component support frames 740 serve to contact the walls 734, top 730 and bottom 736 of hard disk drive case 420, in turn, restricting the movement of hard disk drive component 720 in substantially any direction and dampening any shock transmitted through hard disk drive case 420 before it reached hard disk drive component 720.

It will be noted that the above description are examples only and the construction and configuration of various embodiments of shock protection may be determined based upon a wide variety of factors including those factors related to the context in which the embodiment is to be deployed such as the type of chassis with which shock protection is to be utilized, type of, or factors associated with the electronic components to be protected, desired level of shock protection, ease of fabrication or manufacturability, including welding, machineability or ductility, size and operational parameters of the mobile computer, components or devices, such as dimensions, surface area or any number of other factors which may be taken into account when designing, constructing or manufacturing such a shock protection solution.

Figure 8:
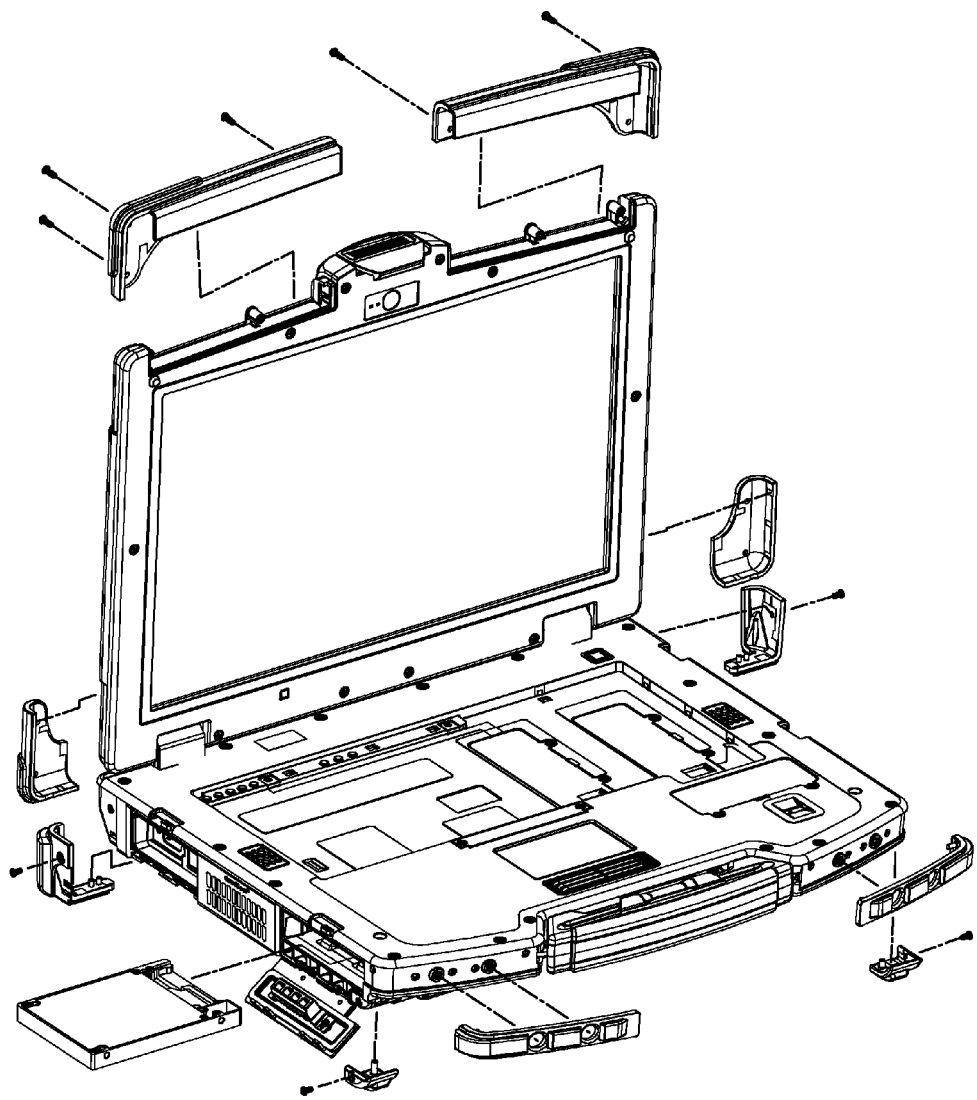
FIGS. 8-11 depict one embodiment of a tiered shock solution.
Figures 9A, 9B:
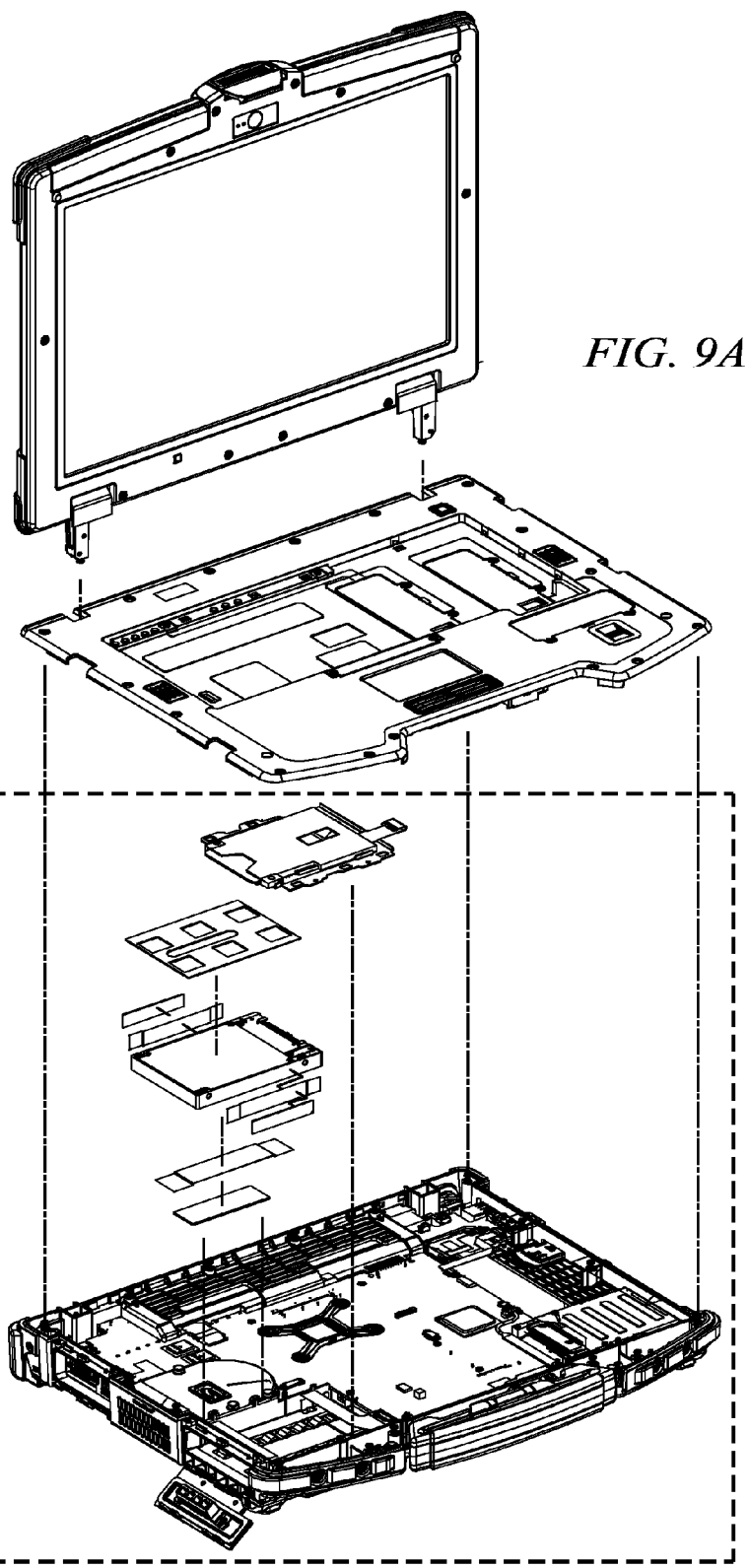
Figure 9B:
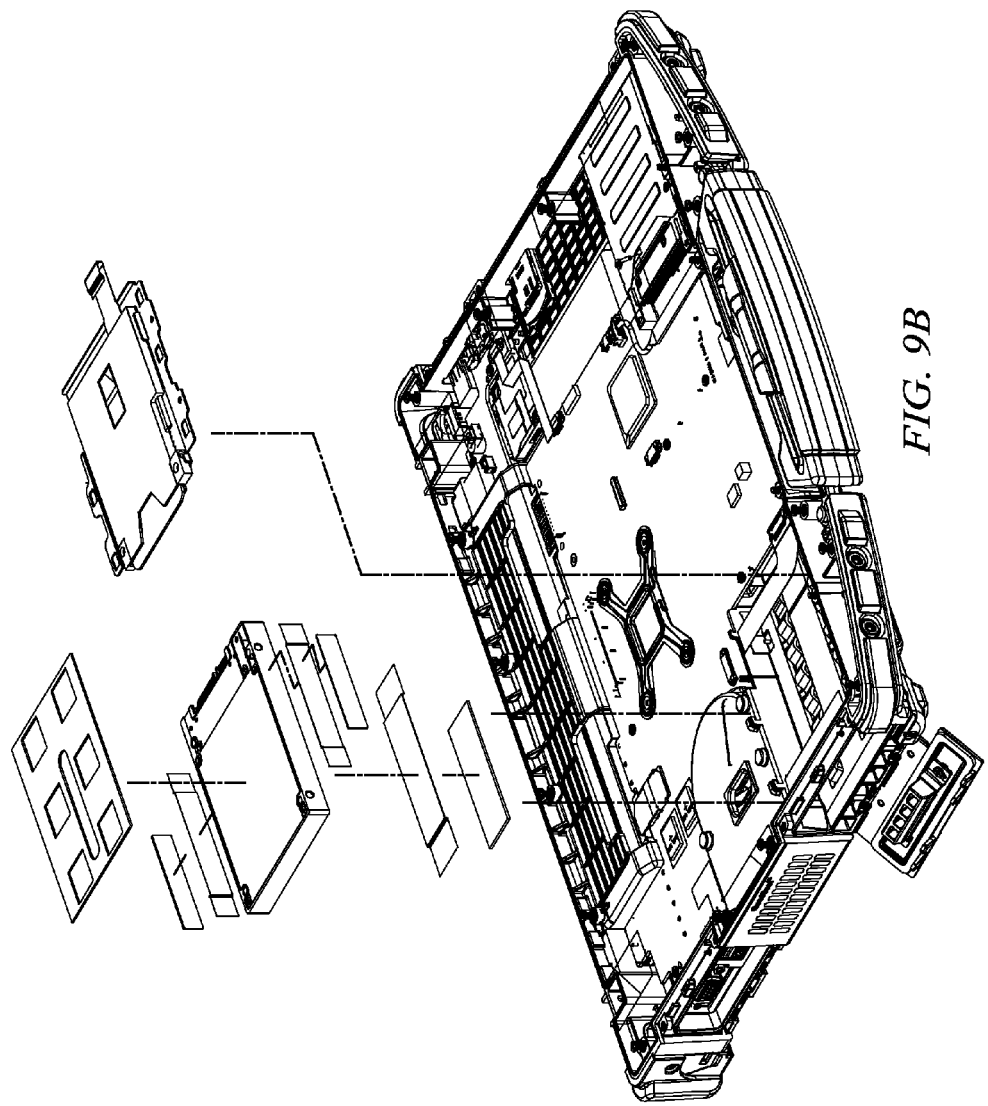
Figures 10A, 10B:
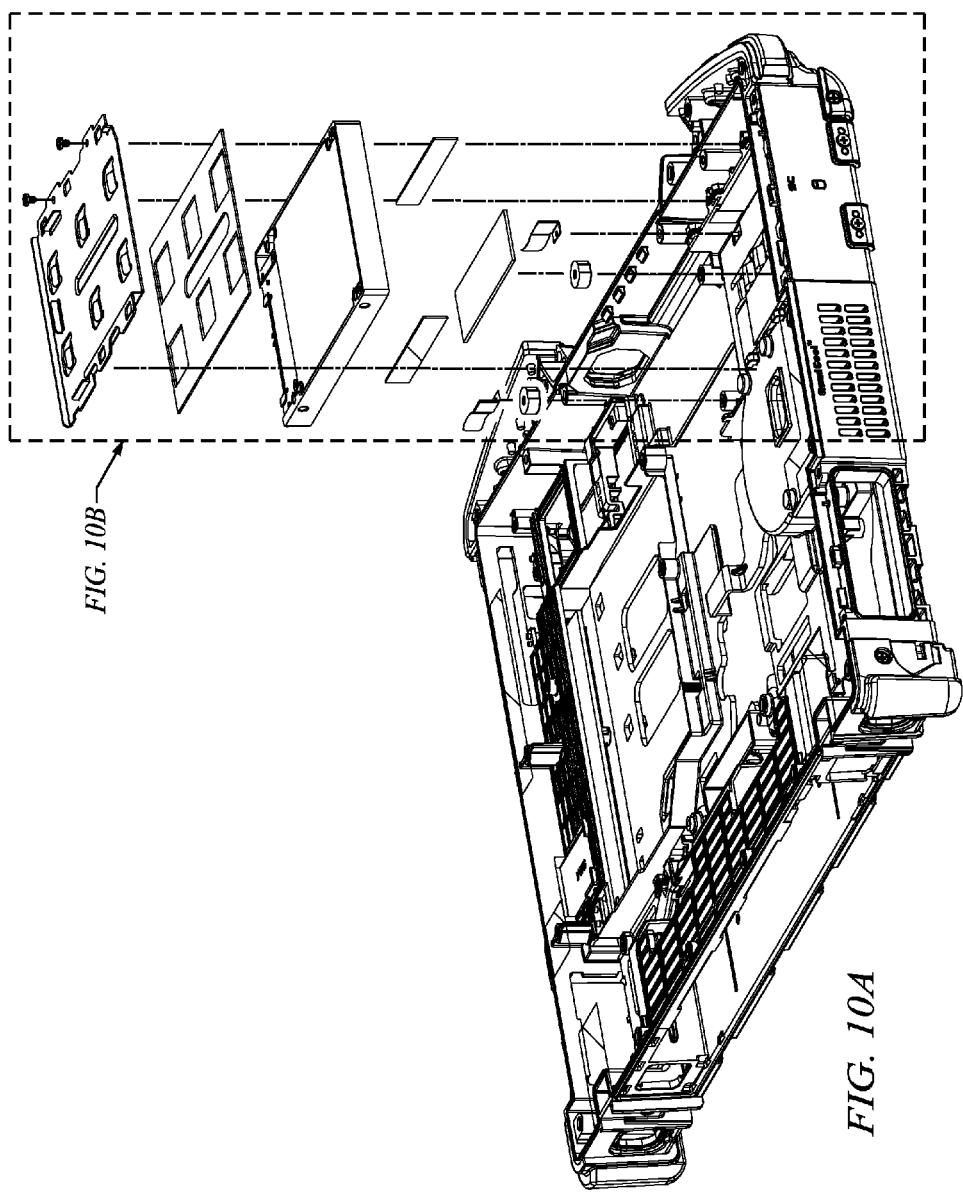
Figure 10B:
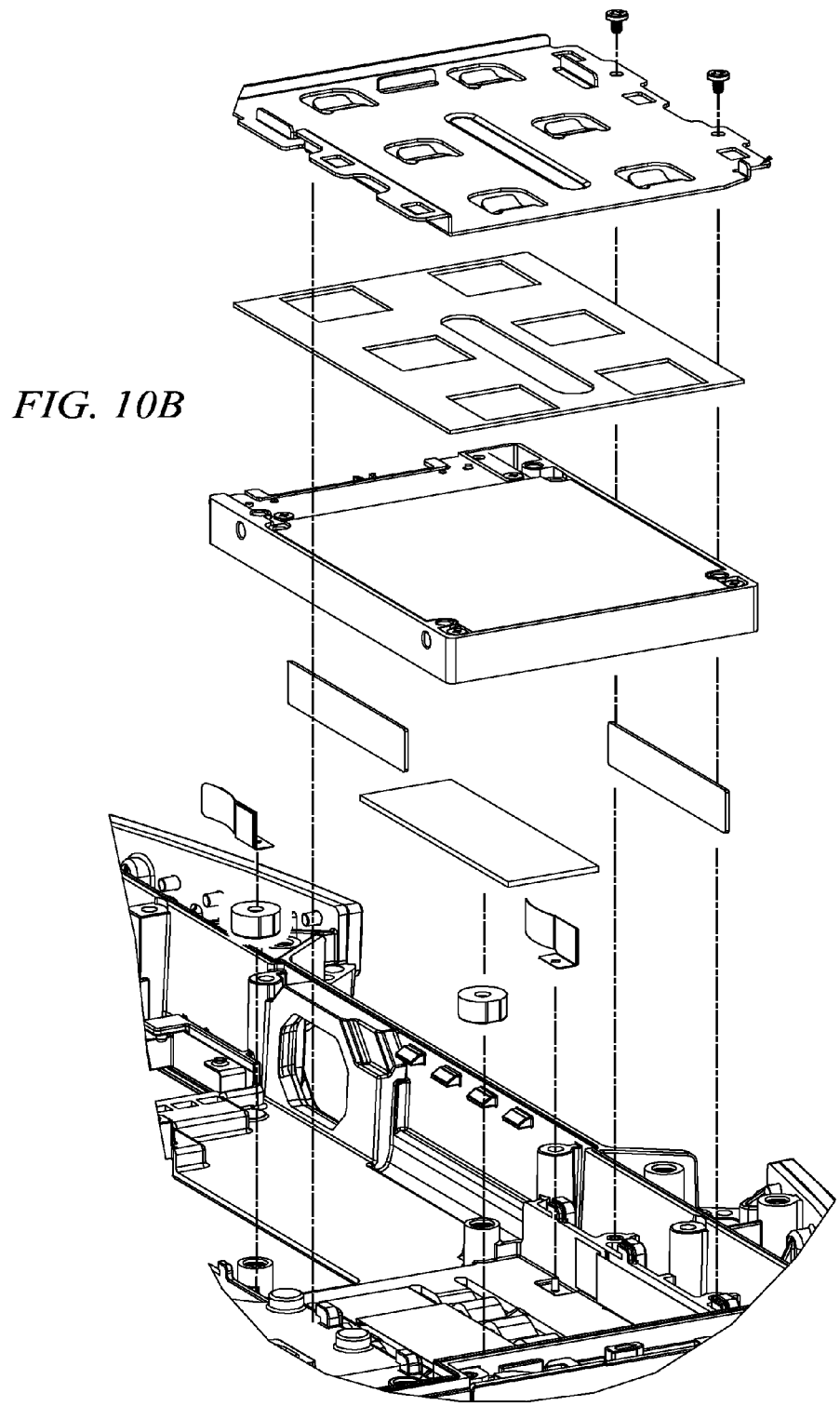
Figure 11:
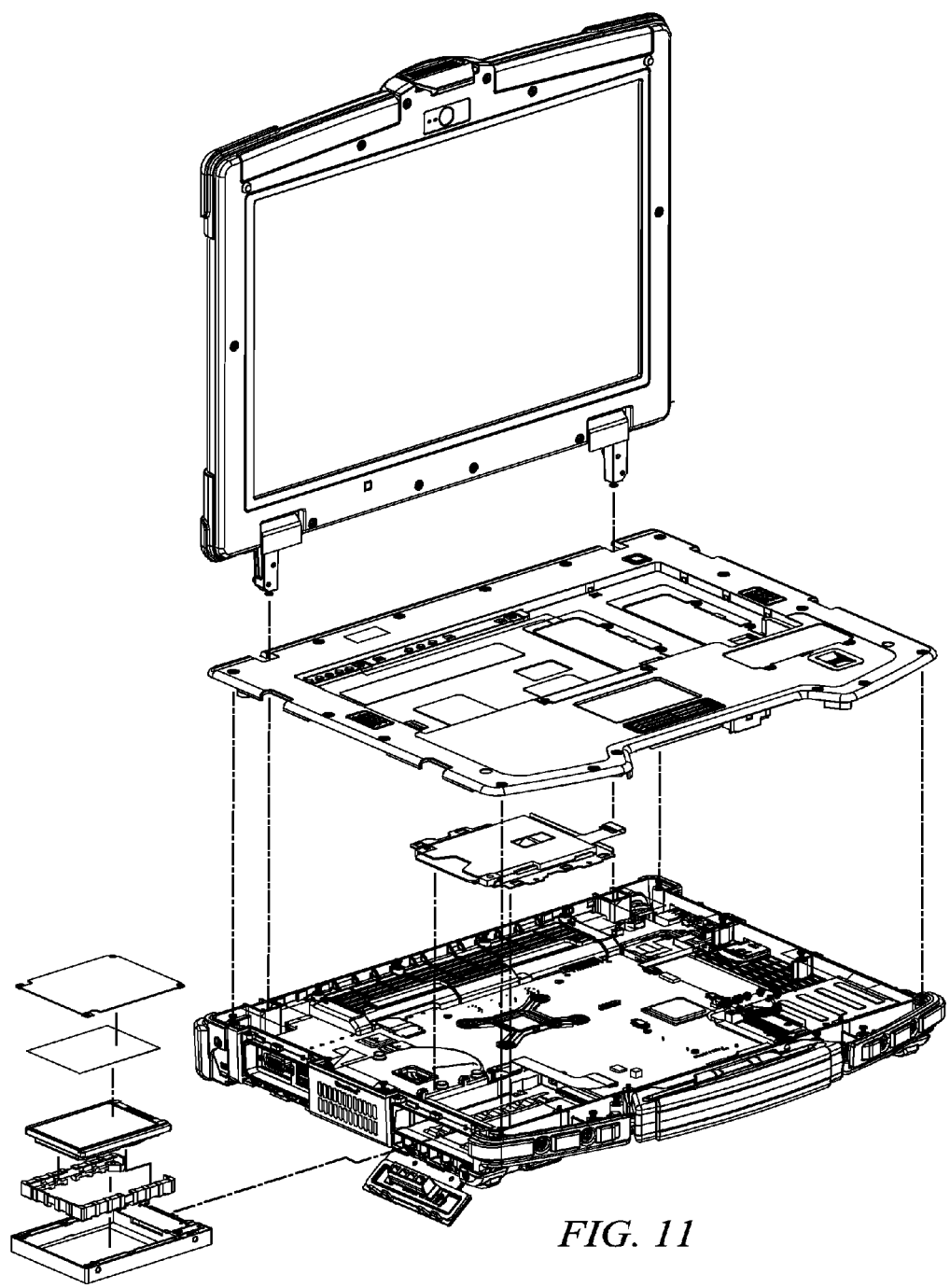

It may now be useful to give specific examples of the various components of one particular embodiment of a cooling solution which may be used in conjunction with a motherboard manufactured by Dell (one example of which is part no. WM402) utilizing a dual core Intel Centrino processor and associated Northbridge and Southbridge ASICs. FIGS. 8, 9A and 9B depict views of one embodiment of a chassis in conjunction with embodiments of dampeners which may be used with this embodiment of a chassis. Additionally, these figures depict an embodiment of zone level protection which may be utilized in conjunction with a hard disk drive device in a hard disk drive compartment of the chassis. FIGS. 10A and 10B depict more details of the embodiment of zone level protection as utilized with a hard disk drive component in a hard disk drive compartment of the chassis depicted in FIGS. 8, 9A and 9B. FIG. 11 depicts an overall view of the use of the embodiment of both component and zone level protection for the hard disk drive in the embodiment of the chassis.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A mobile computing device having a chassis and an opening on a side for receiving a device, comprising:
   a first plurality of dampeners overmolded to the chassis, wherein each dampener of the first plurality of dampeners is positioned relative to one or more of a corner, edge, surface, door, vent, port, and opening and comprises dampening material, wherein each dampener of the first plurality of dampeners is configured to dampen shock to the chassis resulting from contact with one or more of the first plurality of dampeners, wherein the chassis isolates devices and components of the mobile computing device from environmental exposure;
   a second plurality of dampeners positioned inside a device compartment accessible via the side opening, the device compartment configured with a top surface, a bottom surface, two side surfaces, a first end and a second end, wherein the dimensions of the side opening to the device compartment are based on the dimensions of the first end, wherein each dampener of the second plurality of dampeners is configured to isolate the device which is received via the opening on the side of the mobile computing device and which is positioned in the device compartment from shock propagated through the chassis, wherein the second plurality of dampeners comprises:

a leaf spring on each of the top surface, the bottom surface, and the two side surfaces of the device compartment; and dampening material on the top surface, the bottom surface, the two side surfaces, and the first end of the device compartment, wherein the leaf springs and the dampening material are configured to contact the device when the device is positioned in the device compartment; and a dampener support frame comprising dampening material, wherein the outer dimensions of the dampener support frame are formed larger in every dimension than the outer dimensions of a component which is positioned inside the device and which is smaller than the inner dimensions of the device, wherein the dampener support frame is configured to surround the component when the component is positioned inside the device and wherein the dampener support frame restricts movement of the component positioned inside the device which is inside the device compartment of the chassis of the mobile computing device.

2. The mobile computing device of claim 1, wherein the first plurality of dampeners comprise a thermoplastic elastomer.

3. The mobile computing device of claim 2, wherein at least one of the leaf springs is formed integral to the top surface, the bottom surface, or the two side surfaces of the device compartment.

4. The mobile computing device of claim 3, wherein the dampening material positioned in the device compartment includes an opening formed to allow the at least one of the leaf springs to contact the device.

5. The mobile computing device of claim 1, wherein the dampening material disposed between the component and the device is formed as a plurality of support frames dimensioned according to the interior walls of the device and around the component.

6. The mobile computing device of claim 1, wherein the device is a hard disk drive with a form factor of 2.5 or smaller.

7. The mobile computing device of claim 1, wherein the leaf spring is formed in a bracket.

8. The mobile computing device of claim 7, wherein at least one of the leaf springs is positioned on the bottom surface of the device compartment adjacent to a bottom surface of the device.

9. The mobile computing device of claim 8, wherein the bottom of the device compartment is formed by the chassis.

10. A method for providing multi-tiered protection for a component in a mobile computing device having a chassis with a side opening for a device, comprising:

positioning a dampener support frame comprising dampening material inside a device, wherein the outer dimensions of the dampener support frame are formed larger in every dimension than the outer dimensions of a component which is positioned inside the device and which is smaller than the inner dimensions of the device, wherein the dampener support frame is configured to surround the component when the component is positioned inside the device and wherein the dampener support frame restricts movement of the component positioned inside the device which is inside a device compartment of the chassis of the mobile computing device;

overmolding a first plurality of dampeners to the chassis, wherein each dampener of the first plurality of dampeners is positioned relative to one or more of a corner, edge, surface, door, vent, port, and opening and comprises dampening material, wherein each dampener of the first plurality of dampeners is configured to dampen shock to the chassis resulting from contact with one or more of the first plurality of dampeners, wherein the chassis is sealed to isolate devices and components of the mobile computing device from environmental exposure; and positioning a second plurality of dampeners positioned inside the device compartment configured with a top surface, a bottom surface, two side surfaces, a first end and a second end, wherein each dampener of the second plurality of dampeners is configured to isolate a device which is positioned in the device compartment from shock propagated through the chassis, wherein the second plurality of dampeners comprises:

a leaf spring on each of the top surface, the bottom surface, and the two side surfaces of the device compartment; and dampening material on the top surface, the bottom surface, the two side surfaces, and the first end of the device compartment, wherein the leaf springs and the dampening material are configured to contact the device when the device is positioned in the device compartment, wherein the device is inserted into or removed from the device compartment via the side opening of the chassis and the first end of the device compartment.

11. The method of claim 10, wherein the device has a form factor of 2.5 or less.

12. The method of claim 11, wherein the device comprises a hard disk drive.

13. The method of claim 10, wherein the first plurality of dampeners comprise a thermoplastic elastomer.

14. The method of claim 10, wherein the dampening material of the second plurality of dampeners comprises a thermoplastic elastomer.

15. The mobile computing device of claim 1, wherein the first plurality of dampeners comprise a thermoplastic elastomer.

16. The mobile computing device of claim 1, wherein the dampening material of the second plurality of dampeners comprises a thermoplastic elastomer.

* * * * *